United States Patent Office 3,297,758
Patented Jan. 10, 1967

3,297,758
2,2′,5-TRICHLORO-4,4′-METHYLENEDIANILINE
Guenther Kurt Hoeschele, Foulk Woods, Wilmington, Del., assignor to E. I. du Pont de Nemours and Company, Wilmington, Del., a corporation of Delaware
No Drawing. Filed Nov. 26, 1963, Ser. No. 326,256
1 Claim. (Cl. 260—570)

This invention relates to a novel dianiline compound, mixtures thereof and their preparation. More particularly, this invention relates to this compound and its use as a chain-extending or curing agent for polyisocyanate compositions and epoxide resins.

The novel compound of this invention is 2,2′,5-trichloro-4,4′-methylenedianiline and is represented by the formula

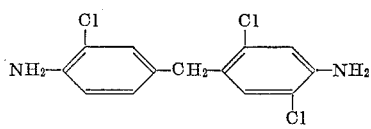

It has been found that this compound as well as mixtures thereof with a minor amount of 2,2′-dichloro-4,4′-methylenedianiline are particularly effective as curing agents for polyisocyanate compositions providing improved control of scorch and vulcanizate hardness.

This 2,2′,5-trichloro-4,4′-methylenedianiline is made by reacting o-chloroaniline, 2,5-dichloroaniline, and formaldehyde in water in the presence of a mineral acid.

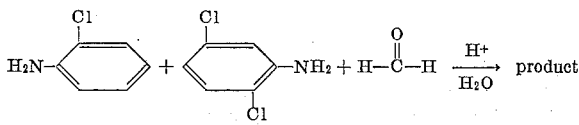

The stoichiometry requires the consumption of a molar proportion of each of the two amines for the formation of a mole of product. It was found that o-chloroaniline and 2,5-dichloroaniline have about the same reactivity in this formaldehyde condensation reaction as evidenced by the fact that any unreacted monoamine portion consists of an approximately equimolar mixture of the two amines. The formation of the novel asymmetrical reaction product of the present invention is favored.

Stoichiometric proportions of reactants can be used; however, the proportions may be varied. If a pure product is desired, it is often preferred to use a molar excess (e.g., 50%) of the o-chloroaniline over the 2,5-dichloroaniline to suppress the formation of the tetrachloro compound which, on account of its high melting point and low volatility, is hard to separate from the desired trichloro product. When an excess of o-chloroaniline is used, formation of the tetrachloro compound is minimized. It is then possible to eliminate the residual dichloro compound by fractional crystallization; however, for many purposes it is advantageous to use the dichloro compound in admixture with the 2,2′,5-trichloro-4,4′-methylenedianiline of this invention. This point will be discussed later in more detail.

As is shown in the above equation, one molar proportion of formaldehyde is consumed for each molar proportion of product formed. Instead of formaldehyde, compounds which are capable of generating formaldehyde under acidic conditions, such as methylal $CH_2(OCH_3)_2$, can be used. In general, it is preferred to supply about two equivalents of the total amine for each mole of formaldehyde present. Thus, if 0.4 mole of 2,5-dichloroaniline and 0.6 mole of o-chloroaniline are employed, at least about 0.5 mole of formaldehyde is supplied. If less formaldehyde is provided, the percentage of conversion of starting materials to product will diminish. The presence of a small amount of monoamine can be helpful in depressing the melting point of the product mixture to facilitate the subsequent neutralization and washing operation.

It is economically undesirable and generally unnecessary to supply any molar excess of formaldehyde. If desired, a very slight excess, for example 5%, can be used. If excess formaldehyde is allowed to remain in the reaction mixture and the latter is made very basic, a Cannizzaro reaction may occur leading to destruction of the formaldehyde and the resulting formation of methanol, sodium formate and water.

The reagents can be brought together in any order. For example, formaldehyde can be added to a mixture of acid and o-chloroaniline at room temperature, followed by introduction of 2,5-dichloroaniline. Formaldehyde can be added to a mixture of acid and 2,5-dichloroaniline, o-chloroaniline subsequently being supplied. Formaldehyde can be introduced into a mixture of acid, o-chloroaniline, and 2,5-dichloroaniline. The amines can be added to acidic formaldehyde. The first two methods are preferred since they yield a somewhat purer product.

The acid required for the reaction is preferably sulfuric or hydrochloric acid. In order to get the best yields, it is preferred that the reaction system be as homogeneous as possible. Although the amines are water insoluble, their acid salts are water soluble. Thus, it is preferred to have about a 10% excess of acid present with the amines to keep them in solution until the reaction is over. For the purposes of this process, sulfuric acid is considered as monobasic.

The reaction can be run at temperatures ranging from 50° C. to 110° C. Frequently the reaction is run between 80° C. and 95° C. At temperatures below about 50° C., the reaction proceeds at a rate that may be inconveniently slow for some purposes. At temperatures above about 110° C., pressure equipment may be required necessitating additional expense. Under representative conditions, the reaction may require about three to six hours. The time needed can be determined empirically by routine experiments in which the reaction mixtures obtained after various time intervals are analyzed for product composition. In order to minimize the formation of the undesired dichloro and tetrachloro dianiline compounds, it is essential that the reactants be in the proper molar proportions when the temperature is high enough to promote rapid formation of the diphenylmethane structure. Accordingly, when the formaldehyde is added or the amines are mixed sequentially, the temperature should be below about 40° C., preferably near room temperature (e.g., 25–30° C.).

After the reaction time is completed, the mixture is made alkaline by the addition of caustic at 100–110° C. Sodium hydroxide or potassium hydroxide is suitable. Since unreacted formaldehyde can react with ammonia to form the cyclic structure hexamethylene tetramine, ammonia is not preferred.

The aqueous phase is decanted and residual water-insoluble organic phase is washed with water to remove alkali. Optionally, the organic phase can be dissolved in a suitable organic solvent, such as ethyl acetate, and the solution extracted with water. Any unreacted o-chloroaniline is removed by steam or vacuum distillation. Recrystallization from aromatic solvents, such as refluxing toluene then gives pure 2,2′,5-trichloro-4,4′-methylenedianiline melting at about 138–140° C. The crude reaction products can be analyzed by partial distillation at 0.2 mm. Hg pressure. Since the 2,2′-dichloro-4,4′-methylenedianiline (B.P. 180–185°/0.2 mm. Hg) is the lowest boiling compound of the three possible reaction products, it will be quantitatively removed from the sample and found among the first distillation products together with some 2,2′,-5-trichloro-4,4′-methylenedianiline (B.P. 210–215° C./0.2 mm. Hg). The dichloro compound content of the distilled portion can be conveniently determined by chlorine analysis.

For most purposes the novel trichloro compound can be used in the crude form. The presence of small amounts of by-products such as the dichloro and tetrachloro compounds reduce the melting point by 20° C. to 30° C. which is desirable for many uses. For many purposes the subject trichloro compound can be used when admixed with the 2,2'-dichloro-4,4'-methylenedianiline over a wide range.

The novel 2,2',5-trichloro-4,4'-methylenedianiline of the present invention is useful as a chain extending agent and as a cross-linking agent for polyisocyanate compositions. As will be discussed hereinafter, this compound provides enhanced control of scorch and vulcanizate hardness. General procedures suitable for using the compound are set forth in U.S. Patent 3,036,996, which concerns the use of polyisocyanate compositions made from polyether glycols and polyether polyols. This compound can also be used to chain extend and cure isocyanate modified polyesters such as are set out in U.S. Patents 2,620,516 and 2,621,166. Many other reactants can also be chain extended or cured with this compound, for example, isocyanate-terminated fatty acid triglycerides (U.S. Patent 2,787,601); isocyanate-terminated castor oil-epoxy resin condensation products (U.S. Patent 2,788,335); and isocyanate-terminated polysulfides (U.S. Patent 2,814,600).

A particularly valuable application is the preparation of polyurethane vulcanizates when a Shore A hardness in the range of about 70 to 80 is desired. A representative composition is made by reacting a stoichiometric amount of 2,2',5-trichloro-4,4'-methylenedianiline with a polyisocyanate composition prepared by reacting a 1.6 molar proportion of 2,4-toluene diisocyanate with 1 molar proportion of polytetramethylene glycol (number-average molecular weight about 1000); the hardness is about 69; substitution of an equivalent amount of the 2,2'-dichloro-4,4'-methylenedianiline gives a vulcanizate having a Shore A hardness of 90. Thus, it is seen that the novel trichloro compound has an unexpected effect and yields compositions having a surprisingly low hardness. By using blends of the two curing agents in various proportions vulcanizates of any Shore A hardness between 69 and 90 can be prepared.

Another valuable application of the novel 2,2',5-trichloro-4,4'-methylenedianiline is the use of the compound as a curing agent in the preparation of very hard polyurethane vulcanizates (Shore D hardness of 70–80) having greatly improved processing characteristics. A representative composition is made by reacting 90–100% of the stoichiometric amount of the novel trichloro dianiline compound with a polyisocyanate composition prepared by reacting 2.0 molar proportions of a mixture of 80% 2,4-toluenediisocyanate and 20% 2,6-toluenediisocyanate with a mixture of one molar proportion of polytetramethylene ether glycol (number-average molecular weight about 1000) and one molar proportion of 1,3-butanediol. When the two components are mixed at 80–100° C., the composition can be processed as a liquid for as long as 3–4 minutes yielding vulcanizates of a Shore D hardness of 75. If, however, an equivalent amount of the similar 2,2'-dichloro-4,4'-methylenedianiline is substituted for the trichloro compound in this reaction, the pot life of the resulting composition is reduced to only about one minute, thereby severely limiting the applications for very hard polyurethanes.

The novel trichloro compound can be used to cure epoxy resins. Representative epoxy resins are described in "Epoxy Resins," Lee and Neville, McGraw-Hill, N.Y. (1957), pages 7, 10, 12, 17, 18, and 20. The epoxy resins can be derived from polyhydric phenols and polyfunctional coupling agents such as polyhalohydrins, polyepoxides, or epihalohydrins. Preparation of these epoxy resins is described in U.S. Patents 2,456,408, 2,503,726, 2,615,007, 2,615,008, 2,668,807, 2,668,805, and 2,698,315. Another class of epoxy resins which can be reacted with the novel trichloro compound includes epoxidized unsaturated natural esters derived from vegetable, animal, and fish oils. The preparation of a large number of these epoxy resins is described in U.S. Patents 2,538,072, 2,581,464, and 2,712,000. The novel trichloro compound may be used to cure epoxide-terminated polyalkylene ether polyurethanes such as are described in U.S. Patent 2,830,038. It can be employed in mixtures of polyurethane diamines and epoxy resins, e.g., those taught in U.S. Patent 2,888,439.

The invention will now be described with reference to the following examples of specific embodiments thereof wherein parts and percentages are by weight unless otherwise specified.

EXAMPLE 1

A. *Preparation of 2,2',5-trichloro-4,4'-methylenedianiline*

A 48.8-gram charge (0.596 gram-mole) of 36.6% aqueous formaldehyde is added at 25–30° C. at once to an agitated slurry consisting of 90 grams (0.706 gram-mole) of o-chloroaniline, 139 grams (1.36 gram-moles) of 95–98% sulfuric acid, and 400 grams of water. After the resulting mixture has been stirred for 10 minutes at 30° C., a 76.2-gram charge (0.47 gram-mole) of 2,5-dichloraniline in powder form is introduced. External heating is applied and the temperature is raised gradually to 90° C. over a period of 90 minutes.

After a reaction temperature of 90–95° C. has been maintained for 3 hours, the external heat is shut off and the composition is made alkaline by the addition of 125 grams of sodium hydroxide. The temperature is kept at 100° C., but the organic phase is still semi-solid. After the water has been decanted, the organic phase is heated to 120° C. while stirred with 50 ml. of a 30% sodium hydroxide solution. The aqueous phase is decanted, the residual organic product dissolved in 400 ml. of ethylacetate and washed with water until the aqueous phase is free of alkali. The solvent is distilled off from the organic layer and the resulting residue is heated at 150° C. (1 mm. Hg) to remove the small amount of o-chloroaniline present. A residue is obtained having a weight of about 174 grams which is a mixture of about 80 mole percent 2,2',5-trichloro-4,4'methylenedianiline and about 20 mole percent 2,2'-dichloro-4,4'methylenedianiline.

The organic residue mixture prepared above is dissolved in refluxing toluene containing charcoal; on being cooled to room temperature (25–30° C.), the filtrate deposits crystals. They are washed successively with toluene and petroleum ether (30–60° C. boiling point range) and recrystallized from hot toluene. The essentially pure product crystals of 2,2',5-trichloro-4,4'-methylenedianiline melt at 138–140° C.

*Analysis.*—Calculated for: $C_{13}H_{11}N_2Cl_3$: C, 51.8; H, 3.68; N, 9.3; Cl, 35.3. Found: C, 51.9–52.1; H, 3.9–4.0; N, 9.2; Cl, 34.8–35.0.

B. *Preparation of polyurethane polymer*

A mixture consisting of 278.7 parts of toluene-2,4-diisocyanate and 1000 parts of anhydrous polytetramethylene ether glycol (number-average molecular weight 1000) is agitated at 80° C. for 4 hours in a dry reaction vessel protected from atmospheric moisture. The fluid product resulting has a free NCO content of 4.1% by weight, a Brookfield viscosity at 30° C. of about 16,500 cps. and a number-average molecular weight of about 2000.

C. *Curing the polyurethane polymer*

A 40-gram charge of the polyurethane polymer is mixed at 100° C. with 5.82 grams of the pure trichlorodianiline prepared in Part A above and the resulting composition is cured by heating for 4 hours at 100° C. The vulcanizate has the following typical properties at 25° C.: modulus at 100% extension, 240 lbs./sq. inch;

modulus at 300% extension, 460 lbs./sq. inch; tensile strength, 2500 lbs./sq. inch; extension at the break, 500%; permanent set, 1%; Yerzley resilience, 57.8%; Shore A hardness, 69.

If the above curing procedure is repeated except that the 5.82 grams of pure trichloro compound are replaced by about 5.3 grams of the 80/20 mixture of trichloro and dichloro compounds (described as the residue mixture in Part A above), the vulcanizate has the following typical properties at 25° C.: modulus at 300% extension, 660 lbs./sq. inch; tensile strength, 3000 lbs./sq. inch; extension at break, 445%; permanent set, 3%; Yerzley resilience, 55%; Shore A hardness, 72.

EXAMPLE 2

A. *Preparation of 2,2',5-trichloro-4,4'-methylenedianiline*

A 40-gram charge (0.5 gram-mole) of 37% aqueous formaldehyde is added at 25–30° C. to an agitated mixture consisting of 81 grams (0.5 gram-mole) of 2,5-dichloroaniline, 50 grams (0.5 gram-mole) of concentrated hydrochloric acid, and 400 ml. of water. After the thick slurry resulting has been stirred for 15 minutes at 30° C., 63.5 grams (0.5 gram-mole) of o-chloroaniline and 48.5 grams of concentrated hydrochloric acid are added in turn. The temperature is slowly raised to 95° C. while agitation is maintained. During the following 5 hours, the mixture is stirred at 95° C.; it is then neutralized at about 25° C. with 43 grams of sodium hydroxide; the organic layer is separated, washed twice with an equal volume of water at 100° C., and then heated under vacuum to remove water and unreacted amines. The final pot temperature is 150° C. (1 mm. Hg); 7.5 grams of organic distillate are collected. The viscous tar-like liquid residue weighs about 134.5 grams. On being warmed to 60° C. and thereafter cooled to room temperature, this material deposits crystals melting at 105–115° C. typically analyzing as follows: C, 52.0–52.1; H, 3.7–3.8; N, 8.7–8.9; Cl, 35.3–35.6.

B. *Preparation of polyurethane polymer*

A polyurethane polymer is prepared by the procedure of Part B of Example 1.

C. *Curing polyurethane polymer*

A 110-gram charge of the polyurethane polymer is mixed at 100° C. with 15.35 grams of the trichlorodianiline prepared in Part A above and the resulting composition is cured by heating for 3 hours at 100° C. The Vulcanizate displays the following typical properties at 25° C.: modulus at 100% extension, 205 lbs./sq. inch; modulus at 300% extension, 400 lbs./sq. inch; tensile strength, 2000 lbs./sq. inch; extension at the break, 500%; permanent set, 2%; Yerzley resilience, 55.3%; Shore A hardness, 64. Similar results are obtained when the cure time is lengthened to 4 to 6 hours.

EXAMPLE 3

Example 2 is repeated except as indicated herein. Part A hereof is the same as that of Example 2.

B. *Preparation of polyurethane polymer*

A mixture containing 348.4 grams (by weight) of toluene 2,4-diisocyanate and 1000 parts (by weight) of anhydrous polytetramethylene ether glycol (number-average molecular weight 1000) is agitated at 80° C. for 4 hours in a dry reaction vessel protected from atmospheric moisture. The fluid product obtained has a free NCO content of 6.3% by weight, a Brookfield viscosity at 30° C. of 6000 to 7000 cps., and a number-average molecular weight of about 1348.

C. *Curing the polyurethane polymer*

A fluid composition consisting of 40 parts by weight of polyurethane polymer of Part B above and 8.6 parts by weight of the trichlorodianiline prepared in Part A of Example 2 is heated for 3 hours at 100° C. The resulting vulcanizate displays the following typical properties at 25° C.: modulus at 100% extension, 700 lbs./sq. inch; modulus at 300% extension, 6000 lbs./sq. inch; tensile strength, 6000 lbs./sq. inch; extension at the break, 300%; permanent set, 1%; Yerzley resilience, 19%; Shore A hardness, 87.

EXAMPLE 4

Example 2 is repeated except as indicated herein. Part A hereof is the same as that of Example 2.

B. *Preparation of polyurethane polymer*

Five hundred parts (by weight) of anhydrous polytetramethylether glycol (number-average molecular weight 1000) and 45 parts of 1,3-butanediol are added, with stirring, to 348.4 parts of a toluene diisocyanate isomer mixture (80% of 2,4- and 20% of 2,6-) in a dry reaction vessel under a protective nitrogen atmosphere. During this operation the temperature is kept below 80° C. Thereafter, the mixture is agitated at 80° C. for 4 hours. The fluid composition which results has a free NCO content of 9.3% by weight and a Brookfield viscosity at 30° C. of about 17,000 centipoises.

C. *Curing the polyurethane polymer*

A fluid composition of 50 parts by weight of the polyurethane polymer and 14.7 parts by weight of the trichlorodianiline prepared in Part A of Example 2 is heated at 100° C. for 3 hours. The resulting vulcanizate displays the following typical properties at 25° C.: modulus at 100% extension, 4200 lbs./sq. inch; tensile strength, 4900 lbs./sq. inch; extension at the break, 160%; permanent set at break, 59%; Shore D hardness, 75.

EXAMPLE 5

A. *Preparation of 2,2',5-trichloro-4,4'-methylenedianiline*

A 41-gram charge (0.5 gram-mole) of 36.6% aqueous formaldehyde is added at 30° C. to an agitated mixture consisting of 81 grams (0.5 gram-mole) of 2,5-dichloroaniline, 63.5 grams (0.5 gram-mole) of o-chloroaniline, 98.5 grams (1.0 gram-mole) of concentrated hydrochloric acid, and 400 ml. of water. Over a period of an hour the temperature is raised to 80° C. The mixture is then agitated at 80° C. for 6 hours and neutralized at 90–100° C. with 45 grams (1.1 gram-moles) of sodium hydroxide, and worked up by a procedure similar to that of Example 1. The product obtained weighs about 130 grams and typically analyzes as follows: C, 52.2–52.4; H, 3.6–3.7; N, 8.9–9.1; and Cl, 35.2.

B. *Preparation of the polyurethane polymer*

The polyurethane polymer of Part B of Example 1 is used herein.

C. *Curing the polyurethane polymer*

A vulcanizate, obtained by mixing 40 grams of the polyurethane polymer of Example 1 and 5.55 grams of the product of Part A above and heating for 4 hours at 100° C., displays the following typical properties at 25° C.: modulus at 100% extension, 250 lbs./sq. inch; modulus at 300% extension, 450 lbs./sq. inch; tensile strength, 1910 lbs./sq. inch; extension at break, 460%; Yerzley resilience, 56.5%; Shore A hardness, 64.

EXAMPLE 6

*Preparation of a polyurethane polymer*

A polyester polyol having a number-average molecular weight of 1470 is prepared by conventional condensation of two moles of glutaric acid, one mole adipic acid, one mole of succinic acid, and 2.5 moles of ethylene glycol.

A 500-gram charge of the polyester polyol is dried while agitated at 130–140° C. (1 mm. Hg) for about one hour; a small stream of nitrogen is introduced during this period through a capillary projecting into the liquid mass. After the polyester has been cooled to about 85° C., 112.8 grams (92.5 ml.) of a toluene diisocyanate isomer mixture (80% of 2,4- and 20% of 2,6-) are introduced. The resulting composition is agitated at 100° C. for about 45 minutes while a protective atmosphere of dry nitrogen is maintained. The isocyanate-terminated polyester polyurethane product typically contains about 4.2% by weight NCO (theoretical value 4.2%).

*Curing the polyester polyisocyanate composition*

A 100-gram charge of the polyester polyisocyanate composition made above is placed in a dry reaction flask and stirred at 100° C. under vacuum (1 mm. Hg) to remove dissolved gas. Then 14.34 grams of fluid 2,2′,5-trichloro-4,4′-methylenedianiline are introduced. After the resulting composition has been stirred for about 25 seconds to remove entrapped gas, it is poured into a preheated lubricated mold and maintained for 5 hours at 120° C. The vulcanizate thereby obtained displays the following typical properties at 25° C.: modulus at 100% extension, 680 p.s.i.; modulus at 300% extension, 1400 p.s.i.; tensile strength, 3300 p.s.i.; extension at the break, 450%; permanent set at the break, 5%; Shore A hardness, 88; Yerzley resilience, 19%.

EXAMPLE 7

2,2′,5-trichloro-4,4′-methylenedianiline is prepared according to the procedure in Part A of Example 2.

Vulcanizates are prepared from the polyurethane polymer of Example 1 employing various blends of the trichlorodianiline with the dichloro compound as well as the single curing agent as curative. Typical results are shown in the following table (the curative level being 95%):

|  | Stock A | Stock B | Stock C |
|---|---|---|---|
| Polyurethane Polymer, pts | 100 | 100 | 100 |
| 2,2′-Dichloro-4,4′-methylenedianiline, pts | 6.18 | 3.1 | |
| 2,2′,5-Trichloro-4,4′-methylenedianiline | 6.98 | 10.5 | 14 |
| Mole %, 2,2′,5-Trichloro-4,4′-methylenedianiline | 50 | 75 | 100 |
| Mixing Temperature, ° C | 100 | 100 | 100 |
| Cure Temperature, ° C | 100 | 100 | 100 |
| Cure Time, hrs | 4 | 4 | 4 |

When vulcanizates of Stocks A, B, and C are tested at 25° C. after 7 days aging at 25° C./50% relative humidity, typical results are as follows:

|  | Stock A | Stock B | Stock C |
|---|---|---|---|
| Tensile Strength, p.s.i | 4,900 | 3,850 | 3,500 |
| Modulus 100%, p.s.i | 660 | 350 | 250 |
| Modulus 300%, p.s.i | 1,500 | 720 | 550 |
| Elongation at break, percent | 460 | 480 | 450 |
| Yerzley Resilience, percent | 53.2 | 54.5 | 58.7 |
| Hardness, Shore A | 84 | 74 | 64 |
| Compression Set B, percent | 12 | 36 | 15 |
| Tear Strength, D-470, pli | 56 | 46 | 25 |

The above data illustrate the variation in physical properties obtainable with mixtures of the two dianiline compounds.

As many widely different embodiments of this invention may be made without departing from the spirit and scope thereof, it is to be understood that this invention is not limited to the specific embodiments thereof except as defined in the appended claim, and all changes which come within the meaning and range of equivalence are intended to be embraced therein.

What is claimed is:
2,2′,5-trichloro-4,4′-methylenedianiline.

References Cited by the Examiner

UNITED STATES PATENTS

| 1,777,266 | 9/1930 | Kalischer et al. | 260—270 |
| 2,615,046 | 10/1952 | Faith | 260—570 |
| 2,741,656 | 4/1956 | Schmid et al. | 260—160 |
| 2,899,411 | 8/1959 | Schollenberger | 260—77.5 |
| 3,078,257 | 2/1963 | Rinke et al. | 260—77.5 |
| 3,097,191 | 7/1963 | France et al. | |

OTHER REFERENCES

Gorvin et al.: "Journal Chemical Society London," 1955, pages 83–9.

Marxer, "Helv. Chim. Acta.," vol. 37, pages 166–78 (1954).

CHARLES B. PARKER, *Primary Examiner.*

ROBERT V. HINES, *Examiner.*